Figure 1:
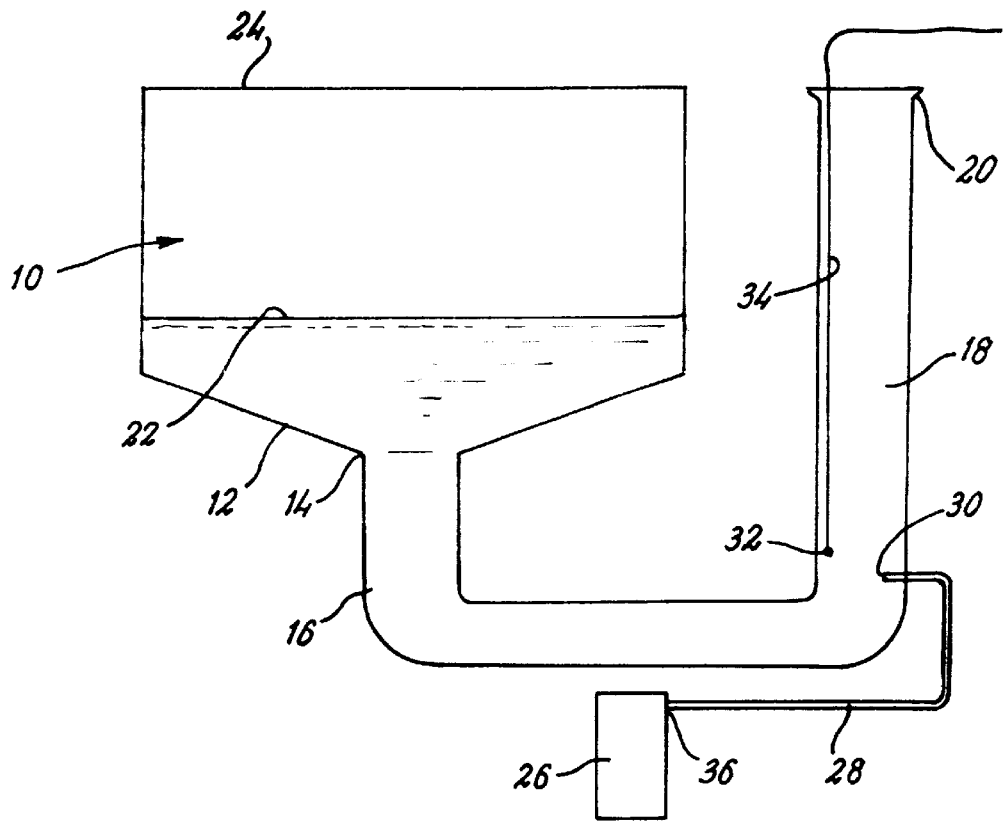

United States Patent
Brade

[19]

[11] Patent Number: 6,123,857
[45] Date of Patent: Sep. 26, 2000

[54] SEPARATING METHOD AND APPARATUS

[75] Inventor: Colin Edward Brade, Mansfield, United Kingdom

[73] Assignee: Monsal Ltd, Mansfield, United Kingdom

[21] Appl. No.: 09/065,343

[22] Filed: Apr. 23, 1998

[51] Int. Cl.⁷ .................................................. B01D 21/24
[52] U.S. Cl. .......................... 210/741; 210/744; 210/803; 210/104; 210/112; 210/533; 210/535
[58] Field of Search ..................... 210/741, 744, 210/803, 104, 112, 143, 220, 532.1, 533, 534, 535

[56] References Cited

U.S. PATENT DOCUMENTS

| | | | |
|---|---|---|---|
| 2,070,201 | 2/1937 | Geary | 210/803 |
| 2,460,834 | 2/1949 | Logre | 210/803 |
| 3,807,560 | 4/1974 | Pentz et al. | 210/803 |
| 5,161,954 | 11/1992 | Matheson et al. | 210/741 |

FOREIGN PATENT DOCUMENTS

| | | |
|---|---|---|
| 10071397 | 3/1998 | Japan . |
| 2138076 | 10/1984 | United Kingdom . |
| 2157584 | 4/1988 | United Kingdom . |

*Primary Examiner*—Christopher Upton
*Attorney, Agent, or Firm*—Watts, Hoffman, Fisher & Heinke Co., L.P.A.

[57] ABSTRACT

A method of removing sludge from a continuously supplied sedimentation tank which discharges through a pipe having a substantially vertical section and an outlet at or just above the fluid level of the tank by supplying pulses of gas to the base of the vertical section of the tank to lift the sludge therein and discharge it from the pipe outlet in which the pulses are continued until the sludge thickness diminishes to a value which is determined by measuring one or more conditions of the sludge, the conditions including the measurement of the drop in level of the sludge at the pipe outlet after discharge due to an air pulse compared with that before discharge and/or the measurement of pressure of the shock wave produced against time and the time taken for this is stabilised to a predetermined value and/or the measurement of the amplitude of the pressure induced in the sludge after commencement of an air pulse and the time taken for this to reduce to a predetermined amplitude. When the condition is detected the air pulses are terminated for a predetermined interval time during which sludge reaccumulates in the base of the tank.

7 Claims, 1 Drawing Sheet

SEPARATING METHOD AND APPARATUS

The present invention concerns improvements in or relating to a method and apparatus for separating. It is especially, but not exclusively, applicable to the removal of sludge from a sewage sedimentation tank but is also applicable, for example, to the separation of a first slurry or sludge from a second less viscous slurry or sludge. In the following specification, the term "sludge" will be used to define all sludges, slurries and solids containing liquids.

U.K. Patent 2157584 discloses a method and apparatus for separating sludges of differing solids content.

Most sewage treatment works use a sedimentation process at one stage in the purification of sewage. The process is a physical one in which settleable solids, which have been held in suspension in the sewage up to that stage, are allowed to settle in quiescent conditions whereupon they form a sludge blanket in the base of a sedimentation tank. This sludge contains about 90% water and is normally removed manually using hydrostatic head or by pumping and allowed to flow by gravity down drains for subsequent treatment.

In the past sludge has been discharged for a predetermined time at intervals which are predetermined by an operator.

The success of this method depended almost entirely on the nature and flow of the sewage supplied to the sedimentation tank. In practical conditions these are never constant so that the choice of discharge duration and the intervals between discharge cycles was always a compromise.

According to one aspect of the invention claimed in our patent GB 2157584 there is provided a method of removing sludge from a sedimentation tank comprising pumping the sludge from the tank through a pipe between the tank and pump and while pumping is being carried out, sensing the pressure at or near the pump inlet whereby a pressure change due to changes in viscosity of the sludge is sensed, discontinuing pumping when a predetermined changed pressure is detected and maintaining a substantially constant level in the tank.

A further aspect of the invention claimed in GB 2157584 is a method of removing sludge from a sedimentation tank comprising connecting an unrestricted outlet pipe to the base of the tank, causing sludge to flow through the pipe, sensing the solids content of the sludge in the pipe by measuring its viscosity, discontinuing flow of sludge when the viscosity falls below a predetermined value and repeating the method after a predetermined delay.

Another aspect of the invention claimed in GB 2157584 is a method of removing sludge from a sedimentation tank comprising removing sludge from the tank base through a pipe having a substantially vertical section, supplying air to the vertical section of the pipe to lift the sludge therein, and discharge it from the pipe outlet, discontinuing the air supply, measuring the recovery time taken for the level of sludge below the pipe outlet to return to the level in the tank, thereafter repeating the method until a predetermined recovery time is measured and deactuating the air supply for a predetermined time interval.

The present invention provides methods of removing sludge which can be used as alternatives to or in addition to the methods set out in the preceding three paragraphs, especially methods involving apparatus comprising a tank for the sludge, an outlet pipe from the tank having a substantially vertical section leading to its outlet and means for intermittently supplying air to the vertical section of the pipe to lift the sludge therein and discharge it from the pipe outlet.

According to the present invention there is provided a method of removing sludge from a continuously supplied sedimentation tank by removing sludge from the base of the through a pipe having a substantially vertical section, including the steps of supplying gas to the vertical section of the pipe to lift the sludge therein and discharge it from the pipe outlet, characterised in that the method including also the step of measuring one or more of the conditions in the group of conditions comprising the drop in level of sludge at the pipe outlet after discharge compared with that before discharge and the properties of the shock wave generated in the sludge due to each supply of gas, repeating the gas supply and measuring step(s) until a predetermined condition(s) is measured and thereafter terminating the gas supply for a predetermined interval of time during which sludge reaccumulates in the tank.

According to the present invention there is provided a method of removing sludge from a sedimentation tank by removing sludge from the base through a pipe having a substantially vertical section, supplying gas in pulses to the vertical section of the pipe to lift the sludge therein and discharge it from the pipe outlet, characterised by discontinuing the gas supply, measuring the drop in level of sludge at the pipe outlet after discharge compared with that before discharge, repeating the air supply and measurement until a predetermined drop is measured and thereafter deactivating the air supply for a predetermined time interval during which sludge reaccumulates in the tank.

According to another aspect of the present invention there is provided a method of removing sludge from a sedimentation tank comprising removing sludge from the tank base through a pipe having a substantially vertical section, supplying air to the vertical section of the pipe to lift the sludge therein and discharge it from the pipe outlet, characterised by discontinuing the air supply, measuring the pressure of the shock wave produced in the sludge against time, repeating the air supply and pressure/time measurement and repeating the method until a predetermined time is measured during which the shock wave pressure stabilises to a predetermined value and deactivating the air supply for a predetermined time interval during which sludge reaccumulates in the tank.

Still further according to the present invention there is provided a method of removing sludge from a sedimentation tank comprising removing sludge from the tank base through a pipe having a substantially vertical section, supplying the air to the vertical section of the pipe to the lift sludge therein and discharging it from the pipe outlet, characterised by discontinuing the air supply, measuring the amplitude of the shock wave induced in the sludge after commencement of the air supply, repeating the method until a predetermined amplitude is measured and deactivating the air supply for a predetermined time interval during which sludge reaccumulates in the tank.

Preferably any of the methods set out in the preceding three paragraphs and the said other method claimed in our prior Patent GB 2157584 are combined to increase the accuracy of measurement.

Preferably the pressure, time and amplitude of the shock wave are determined by sensing pressure within the outlet pipe upstream the air introduction means. Alternatively the pressure sensing means may be included in the air supply means.

The present invention also provides apparatus for removing sludge from a sedimentation tank comprising an outlet in the base of the tank, a sludge removal pipe leading from the outlet, the pipe having an outlet arranged at the liquid level of the tank and a substantially vertical section immediately downstream of the outlet, means for maintaining the level of liquid in the tank at a constant level, means for supplying air to the lower region of said vertical pipe section, means for regulating the gas supply to pulses characterised in that the apparatus including also means for measuring one or more of the conditions in the group comprising the drop in level of sludge at the pipe outlet after discharge due to a pulse of gas and the properties of the shock wave developed in the sludge due to each supply of gas and means for detecting a predetermined changed in condition and air supply terminating means.

An embodiment of the present invention will now be described by way of example only with reference to the accompanying drawing, in which:-

FIG. 1 shows diagrammatically and in elevation a sludge settlement tank and discharge assembly.

The drawing shows a sludge settlement tank 10 having a downwardly inclined base 12 directed towards a tank outlet 14 to which an outlet pipe 16 is connected, the outlet pipe having a straight vertical section 18, the outlet 20 from which is the same level as the top of the tank 10.

Settled sludge in the tank accumulates in the lower portion of the tank to form a layer 22. The supply of sludge to the tank 10 is effectively constant, clarified sludge escaping over the upper edge 24 of the tank.

Separated sludge is removed from the apparatus utilising the air lift principle, that is supplying pulses of compressed air from a compressor 26 through an air delivery pipe 28 to an air injector nozzle 30 which introduces air into the lower end of the vertical section 18 of the outlet pipe. A volume air is thus introduced to the pipe and as it moves upwardly towards the surface it causes sludge within the pipe to move from inlet 14 to outlet 20, the sludge discharging over the edges of the pump outlet 20. The pulsed supply of air is confined to a predetermined time and thereafter terminated until sludge has passed the injector 30 and returned to an equilibrium level near the outlet 20. A further pulse of air is supplied to continue the discharging process which is terminated when the sludge level 22 is reduced to a point at which the solids content is less than a predetermined value at which stage the discharging operation is terminated until such times as a further layer of sludge has accumulated.

It may be desirable to divert sludge initially discharging from the pipe 16. This will be a sludge having a low solids content from the end of the previous discharge cycle. After a predetermined time when this low solids content sludge has been discharged the diversion is discontinued so that high solids content sludge can be moved to further processing stages.

The present invention provides methods for detecting the solids content level in the sludge so that discharge can be terminated when a predetermined low level is detected.

In one of its aspects, the present invention depends upon the discovery that after a pulse of air has caused sludge to be discharged from the vertical section 18 of the outlet pipe, conditions within the pipe, for example frictional losses, will result in the upper level of sludge in the pipe, when balanced conditions apply, being lower than the outlet, that is the level of material within the tank 10. The difference in level is related to the solids contents within the sludge so that when the difference decreases to a predetermined value it can be assumed that the solids content of the sludge in the outlet pipe has reached the predetermined low value and discharge can be discontinued.

A further aspect of the present invention results from the discovery that on the introduction of air into the vertical section 18 of the outlet pipe the sludge thereabove is subjected to a shock wave. It has been further discovered that the length of time taken by the shock wave to stabilise that is to reach a predetermined value, for example the pre-pulse value is related to the solids contents of the sludge and furthermore the amplitude of the shock wave is related to the solids contents of the sludge. By utilising a pressure transducer taking pressure measurements against time a trace representing the shock wave can be automatically produced and measured. A trace is produced after each pulsed air supply to the vertical section of the pipe and in the first instance a measurement of the time taken for the pressure to reach a predetermined stabilised pressure value which corresponds to a pre-selected low solids content level in the sludge can be detected at which stage the introduction of air pulses is discontinued to allow a layer of high solid content sludge to accumulate in the tank.

In the second instance the measuring means measures the amplitude of the shock wave and when it reaches to a predetermined value corresponding to a pre-selected low solids content in the sludge, the pulsed air supply can be terminated.

The pressure transducer may comprise a pressure sensor 32 at the end of a probe 34 inserted down into the vertical section 18 of the outlet pipe 16 or, in a modification, it may be a pressure sensor 56 at the outlet of the air compressor 26.

Each of the three methods described above may be used independently to give an indication of solids contents within the slurry or they may be used in combination and cross referenced. The methods described in our prior patent 2157584 may also be used in combination with one or more of the above methods described in the embodiment.

It will be realised that in the method involving level measurement the conditions in the vertical section of the outlet pipe result from the behaviour of the sludge in the entire outlet pipe whereas in the shock wave detection method the behaviour giving rise to the shock measurement in that of the sludge in the vertical section of the pipe.

I claim:

1. A method of removing sludge from a continuously supplied sedimentation tank by removing sludge from the base of the tank through a pipe having a substantially vertical section, including the steps of supplying a quantity of gas as a pulse to the vertical section of the pipe to lift the sludge therein and discharge it from the pipe outlet, measuring one or more of the conditions in the group of conditions comprising drop in level of sludge at the pipe outlet after discharge compared with that before discharge and the properties of the shock wave generated in the sludge due to each supply of gas, repeating the gas supply and measuring step(s) until a predetermined condition(s) is measured and thereafter terminating the gas supply for a predetermined interval of time during which sludge reaccumulates in the tank.

2. A method of removing sludge as claimed in claim 1 wherein measuring the property of the shock wave comprises measuring the pressure of the shock wave produced in the sludge against time, until a predetermined time is measured during which the shock wave pressure stabilises to a predetermined value.

3. A method of removing sludge as claimed in claim 1 wherein measuring the property of the shock wave comprises measuring the amplitude of the shock wave induced in the sludge after commencement of a supply of gas until a predetermined amplitude is measured.

4. A method as claimed in claim 1 wherein the time for the level of sludge below the pipe outlet after discharge to return to the level in the tank is measured in addition to any one or more of the conditions in the said group.

5. A method as claimed in claim 1, wherein the properties of the shock wave are determined by sensing pressure within the outlet pipe upstream of the air introduction means.

6. A method as claimed in claim 1, wherein the properties of the shock wave are determined by sensing pressure in the gas supply means.

7. Apparatus for removing sludge from a sedimentation tank comprising an outlet in the base of the tank, a sludge removal pipe leading from the outlet, the pipe having an outlet arranged at the liquid level of the tank and a substantially vertical section immediately downstream of the outlet, means for maintaining the level of liquid in the tank at a constant level, means for supplying gas to the lower region of said vertical pipe section, means for regulating the gas supply to pulses and means for measuring one or more of the conditions in the group comprising the drop in level of sludge at the pipe outlet after discharge due to a pulse of gas and the properties of the shock wave generated, in the sludge due to each supply of gas, means for detecting a predetermined change in condition and, air supply terminating means.

* * * * *